(12) United States Patent  
Nakayama et al.

(10) Patent No.: US 8,194,809 B2  
(45) Date of Patent: Jun. 5, 2012

(54) DIVERSITY RECEIVER AND DIVERSITY RECEIVING METHOD

(75) Inventors: Kazuhiko Nakayama, Miyagi (JP); Shoichi Fujita, Miyagi (JP); Makoto Sasaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 784 days.

(21) Appl. No.: 12/294,684

(22) PCT Filed: Mar. 28, 2006

(86) PCT No.: PCT/JP2006/306262
§ 371 (c)(1),
(2), (4) Date: Sep. 26, 2008

(87) PCT Pub. No.: WO2007/110923
PCT Pub. Date: Oct. 4, 2007

(65) Prior Publication Data
US 2010/0226465 A1 Sep. 9, 2010

(51) Int. Cl.
*H04L 1/04* (2006.01)
(52) U.S. Cl. ............ 375/347; 375/267; 455/101
(58) Field of Classification Search .......... 375/347, 375/267, 316; 455/135, 277.2, 101, 133, 455/132
See application file for complete search history.

(56) References Cited

U.S. PATENT DOCUMENTS

| | | | | |
|---|---|---|---|---|
| 5,561,673 A * | 10/1996 | Takai et al. | ............ | 714/708 |
| 5,940,452 A * | 8/1999 | Rich | ............ | 375/347 |
| 6,023,615 A * | 2/2000 | Bruckert et al. | ............ | 348/14.08 |
| 6,731,921 B1 * | 5/2004 | Militz et al. | ............ | 455/277.2 |
| 7,610,019 B2 * | 10/2009 | Moon et al. | ............ | 455/67.11 |
| 2002/0172162 A1 * | 11/2002 | Goodings | ............ | 370/280 |
| 2003/0022647 A1 * | 1/2003 | Li et al. | ............ | 455/260 |
| 2003/0190924 A1 * | 10/2003 | Agashe et al. | ............ | 455/522 |
| 2005/0197080 A1 * | 9/2005 | Ulupinar et al. | ............ | 455/135 |

FOREIGN PATENT DOCUMENTS

| | | |
|---|---|---|
| JP | 05-316394 A | 11/1993 |
| JP | 08-008809 | 1/1996 |
| JP | 2004-320528 | 11/2004 |
| JP | 2005-159539 | 6/2005 |
| JP | 2005-223510 | 8/2005 |
| JP | 2006-013813 A | 1/2006 |

OTHER PUBLICATIONS

International Search Report for PCT/JP2006/306262; Apr. 20, 2006.

* cited by examiner

*Primary Examiner* — Aristocratis Fotakis
(74) *Attorney, Agent, or Firm* — Pearne & Gordon LLP

(57) ABSTRACT

A purpose of the present invention is to provide a diversity receiver and a diversity receiving method, which are capable of performing a diversity reception without depending upon a moving speed, and also capable of achieving compatibility between reception performance and current consumption. A bit error rate calculator (107) calculates a bit error rate from a demodulation result of a demodulator (106); a switching frequency calculator (108) calculates a switching frequency which corresponds to such a frequency for alternately switching initiating and stopping operations of the diversity reception in response to the bit error rate calculated by the bit error rate calculator (107); and a switching controller (105) performs a switching operation for selecting both two receivers (103, 104), and another switching operation for selecting any one of the two receivers (103, 104) in accordance with the switching frequency calculated by the switching frequency calculator (108) so as to synthesize respective output signals with each other to output a synthesized signal in a case where two sets of the receivers (103, 104) are selected.

2 Claims, 7 Drawing Sheets

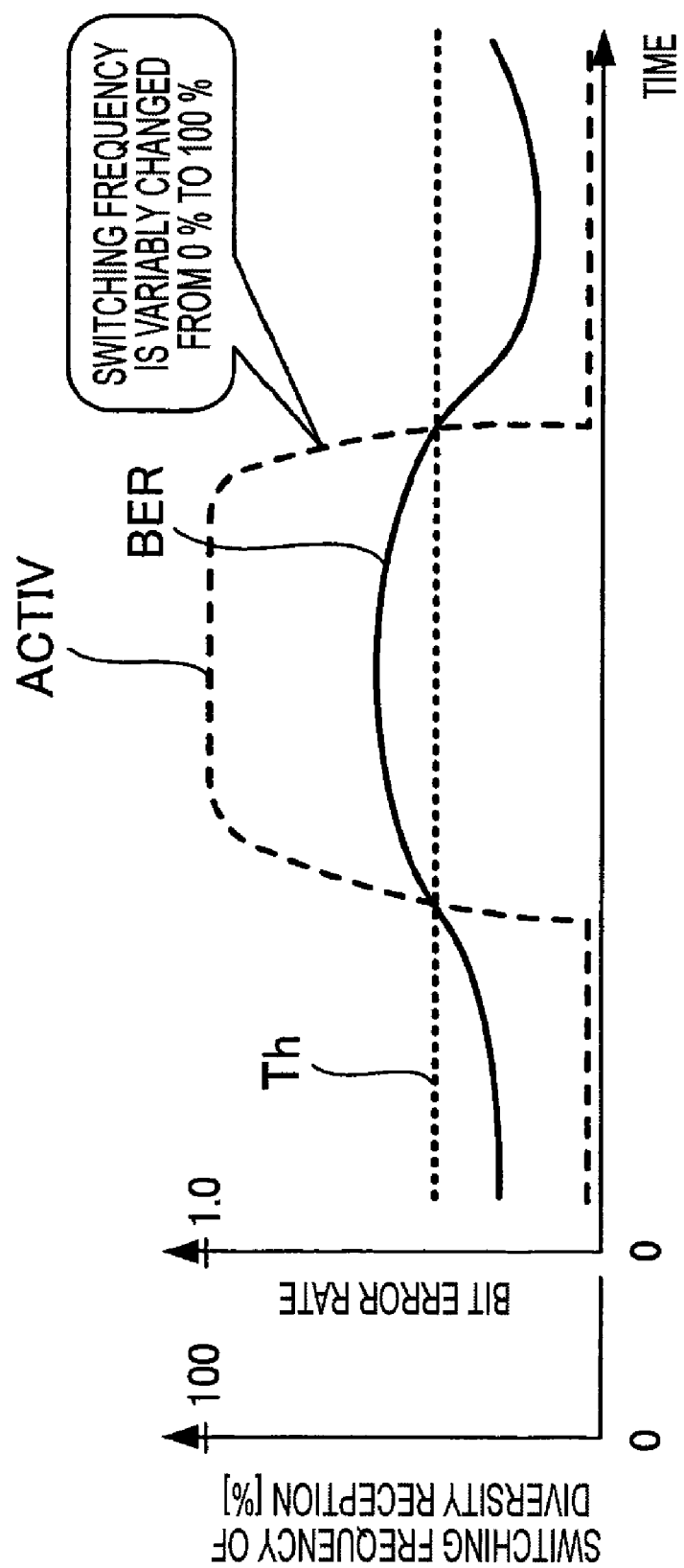

DIVERSITY RECEIVER AND DIVERSITY RECEIVING METHOD

TECHNICAL FIELD

The present invention is related to a diversity receiver and a diversity receiving method.

BACKGROUND ART

Conventionally, diversity receivers equipped with plural receiving branches and capable of improving qualities of signal receptions have been proposed (refer to, for example, patent publication 1). For example, in a conventional diversity receiver, as shown in FIG. 8, a CNR (Carrier to Noise Ratio) meter 1 measures a CNR equivalent to a power ratio of a signal to a noise with respect to radio signals captured by two antennas 2 and 3 respectively; and a receiver 4 performs either a diversity reception or a single reception based upon a measurement result. When the diversity reception is performed, the receiver 4 synthesizes the radio signals received from the two antennas 2 and 3 with each other to output a synthesized signal. When the single reception is carried out, the receiver 4 employs such a radio signal having a higher CNR value within the two antennas 2 and 3, and then, outputs the radio signal derived from the relevant antenna. It should be understood that as the judging elements for judging whether the diversity reception is performed, or the single reception is performed, a fading pitch and the like may be utilized in addition to the CNR. In a diversity reception, although a sufficient reception sensitivity may be obtained, current consumption is large, whereas in a single reception, although current consumption may be small, a sufficient reception sensitivity cannot be obtained. As a result, the diversity reception and the single reception must be properly switched in response on to situations.

Patent Publication 1: JP-A-2004-320528

DISCLOSURE OF THE INVENTION

Problems that the Invention is to Solve

However, in the conventional diversity receiver, the CNR which is employed in the diversity control operation depends upon the moving speed and has the detection error. As a result, the diversity control operation may become complex. FIG. 9 is a diagram for indicating changes in bit error ratios (BERs) which are caused by a difference in moving speeds when a diversity reception is performed and when a single reception is performed. As indicated in this drawing, both when the diversity reception is performed and the single reception is performed, the faster the moving speed is increased, the larger the bit error rate is increased. Thus, switching conditions are different from each other every time the moving speed is changed. FIG. 10 is a diagram for indicating a change in CNR detection values which are caused by a difference in moving speeds. As represented in this drawing, the faster the moving speed is increased, the larger the detection error is increased.

Also, in the conventional diversity receiver, the judgment for switching the diversity reception and the single reception has been carried out based upon a predetermined threshold value. As a result, in such a case that this threshold value is set to a certain value, although a sufficient receiving sensitivity may be obtained even in the single reception, there are some possibilities that the diversity reception is carried out, which may disturb a promotion of the power saving process. In other words, the conventional diversity receiver cannot achieve compatibility between reception performance and current consumption. It should also be understood that in portable communication appliances such as portable telephones, reductions of current consumption is necessarily required due to the following relative items, i.e., higher reception performance is required, and compact batteries are employed.

The present invention is made to solve the above-described problems, and therefore, has an object to provide a diversity receiver and a diversity receiving method, which are capable of performing a diversity reception without depending upon a moving speed, and also capable of achieving compatibility between reception performance and current consumption.

Means for Solving the Problem

The above-described object may be achieved by the below-mentioned arrangement and method.

According to the present invention, a diversity receiver includes: a plurality of antennas which receives radio signals; a plurality of receivers which receives the radio signals respectively, which are captured by the plurality of antennas; a switching controller which switches to select all of the plural receivers and to select any one of the plural receivers in accordance with a switching frequency for alternately switching an initiating operation and a stopping operation of a diversity reception so as to synthesize respective output signals of the plural receivers with each other to output a synthesized signal in a case where all of the plural receivers are selected; a demodulator which demodulates one output signal or all of output signals from the plural receivers selected by the switching controller; a bit error rate calculator which calculates a bit error rate based upon a demodulation result of the demodulator; and a switching frequency calculator which calculates the switching frequency in response to the bit error rate calculated by the bit error rate calculator, in which the switching controller controls a switching operation for performing the diversity reception in accordance with the switching frequency calculated by the switching frequency calculator.

The switching frequency calculator includes a rectangular wave generator, and calculates the switching frequency in response to the bit error rate to generate a rectangular wave having a pulse width responding to the calculating result. The switching controller controls the switching operation for performing the diversity reception while the rectangular wave having the pulse width responding to the switching frequency calculated in the switching frequency calculator is inputted to the switching controller.

The switching frequency calculator decreases the switching frequency in a case where the bit error rate is lower than a predetermined threshold value, and increases the switching frequency in a case where the bit error rate is higher than the predetermined threshold value.

The switching frequency calculator includes a random number generator, and calculates an initiation and the switching frequency of the diversity reception in response to a random number generated by the random number generator. The switching controller controls the switching operation in accordance with the initiation and the switching frequency of the diversity reception calculated by the switching frequency calculator.

According to the present invention, a diversity receiving method for performing a diversity reception by employing a plurality of antennas for receiving radio signals, and a plurality of receivers for receiving the radio signals respectively, which are captured by the plurality of antennas, includes: calculating a bit error rate based upon a result obtained by demodulating one output signal or all of output signals from the plural receivers; calculating a switching frequency for alternately switching an initiating operation and a stopping operation of the diversity reception in response to the calculated bit error rate; and performing a switching operation for selecting all of the plural receivers and selecting any one of the plural receivers in accordance with the calculated switching frequency so as to synthesize respective output signals of the plural receivers with each other to output a synthesized signal in a case where all of the plural receivers are selected.

Advantage of the Invention

In the diversity receiver of the present invention, since the switching frequency for alternately switching the initiation and the stopping operation of the diversity reception is variable, the compatibility between the reception performance and the current reception can be improved. Also, since the switching frequency is controlled in such a manner that the bit error rate becomes smaller than, or equal to the predetermined threshold value, the diversity operation can be controlled in such a manner that the target characteristic can be satisfied without employing the parameters which depend upon the moving speed such as the CNR.

BRIEF DESCRIPTION OF THE INVENTION

FIG. 3 is a diagram for explaining a control as to a switching frequency in the diversity receiver according to the above-described embodiment;

Figure 1:
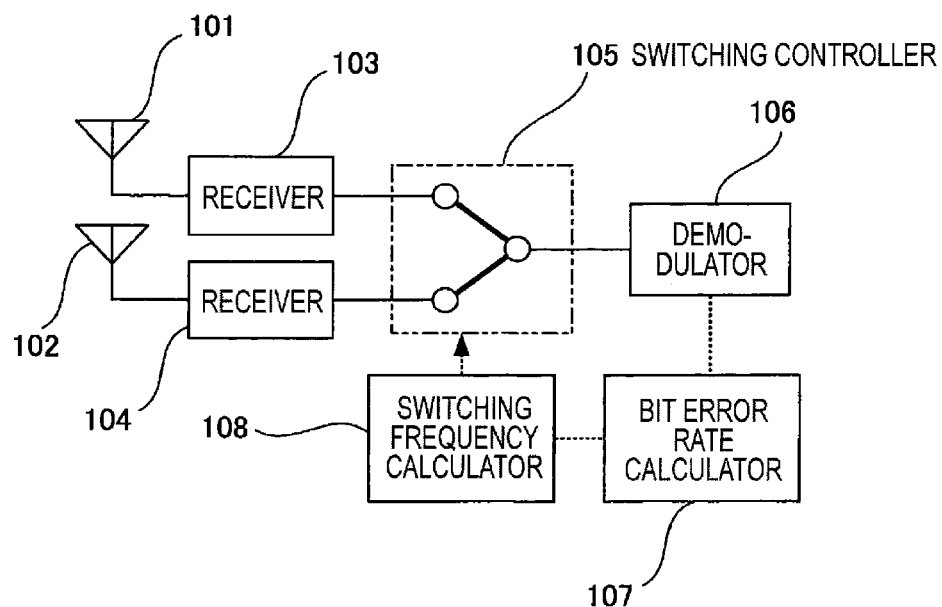
FIG. 1 is a block diagram for schematically showing an arrangement of a diversity receiver according to an embodiment of the present invention.

DESCRIPTION OF REFERENCE NUMERALS AND SIGNS 101,102 antenna
103,104 receiver
105 switching controller
106 demodulator
107 bit error rate calculator
108 switching frequency calculator

BEST MODE FOR CARRYING OUT THE INVENTION

Referring now to drawings, a detailed description is made of preferred embodiments for carrying out the present invention.

FIG. 1 is a block diagram for schematically showing an arrangement of a diversity receiver according to an embodiment of the present invention. In FIG. 1, the diversity receiver of the present embodiment can receive, for example, terrestrial digital broadcasting. The diversity receiver includes antennas 101 and 102 which capture radio signals; a receiver 103 for receiving the radio signal captured by the antenna 101; a receiver 104 for receiving the radio signal captured by the antenna 102; a switching controller 105 for switching to select both the receiver 103 and the receiver 104, and to select any one of the receiver 103 and the receiver 104; a demodulator 106 for demodulating a baseband signal from the switching result output from the switching controller 105; a bit error rate calculator 107 for calculating a bit error rate (BER) from the baseband signal demodulated by the demodulator 106; and a switching frequency calculator 108 for calculating a frequency for alternately switching an initiating operation and a stopping operation of a diversity reception, namely calculates a switching frequency (will also be referred to as "initiation ratio") in response to the bit error rate calculated by the bit error rate calculator 107, and then, enters the calculation result to the switching controller 105.

Figure 2A:
FIG. 2 is a diagram for explaining a control as to a switching frequency in the diversity receiver according to the above-described embodiment.
Figure 2B:
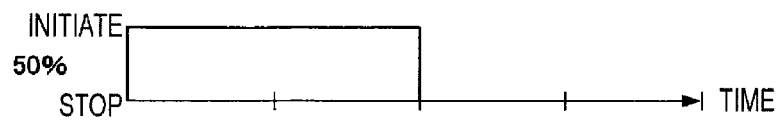
Figure 2C:
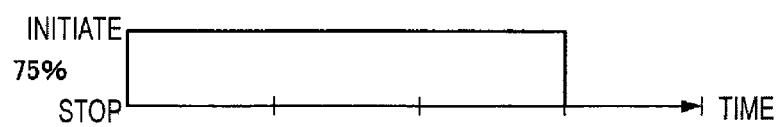

While the switching frequency calculator 108 is equipped with a rectangular oscillator (not shown), the switching frequency calculator 108 calculates a switching frequency in response to a bit error rate, and generates a rectangular wave having a pulse width defined responding to the calculated switching frequency. FIGS. 2A to 2C represent one example of rectangular waves generated by the switching frequency calculator 108; FIG. 2A shows a rectangular wave having a switching frequency of 25%; FIG. 2B indicates a rectangular wave having a switching frequency of 50%; and FIG. 2C represents a rectangular wave having a switching frequency of 75%. The switching frequency of 25% implies that, with respect to a case where a diversity reception is continuously carried out, namely, with respect to the switching frequency of 100%, the diversity reception is performed only for ¼ of the above-described switching frequency of 100%, and the single reception is performed for the remaining ¾ thereof. Similarly, the switching frequency of 50% implies that, with respect to a case where a diversity reception is continuously carried out, namely, with respect to the switching frequency of 100%, the diversity reception is performed only for ½ of the above-described switching frequency of 100%, and the single reception is performed for the remaining ½ thereof. Similarly, the switching frequency of 75% implies that, with respect to a case where a diversity reception is continuously carried out, namely, with respect to the switching frequency of 100%, the diversity reception is performed only for ¾ of the above-described switching frequency of 100%, and the single reception is performed for the remaining ¼ thereof.

While a rectangular wave having a pulse width defined responding to a switching frequency calculated by the switching frequency calculator 108 is inputted to the switching controller 105, the switching controller 105 performs a diversity reception. The rectangular waves having the same pulse widths are repeatedly outputted unless the bit error rate is changed. When the diversity reception is to be carried out, respective output signals from the receivers 103 and 104 are synthesized with each other, and then, the synthesized signal is outputted.

FIG. 3 is a diagram for indicating a relationship ship between a bit error rate and a switching frequency of a diversity reception. As shown in this drawing, in such a case that a bit error rate exceeds a predetermined threshold value "Th", the switching frequency is changed. The switching frequency can be variably changed from 0% to 100%. If the bit error rate exceeds the predetermined threshold value "Th", then the switching frequency is increased, so that a diversity reception is commenced. In this case, while a single receiving operation is basically performed, if a bit error rate exceeds the predetermined threshold value "Th", then a diversity receiving operation is commenced; and the switching frequency is changed in response to the bit error rate while the bit error rate exceeds the threshold value "Th."

Figure 4:
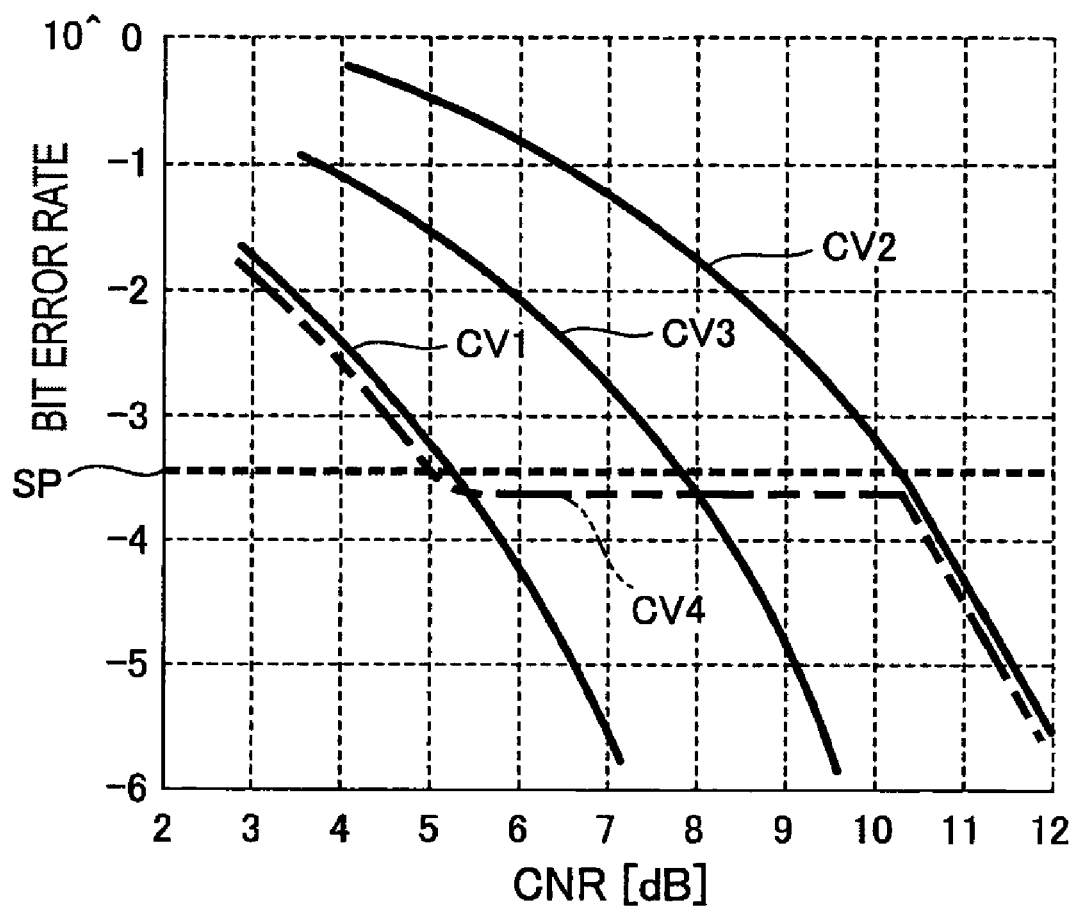
FIG. 4 is a diagram for explaining a control as to a switching frequency in the diversity receiver according to the above-described embodiment.

FIG. 4 is a diagram for showing a variable control of switching frequencies. In this drawing, symbol "CV1" indicates a characteristic for showing a relationship between the CNR and the bit error rate in such a case that the switching frequency is selected to be 100%. Also, symbol "CV2" indicates a characteristic for showing a relationship between the CNR and the bit error rate in such a case that the switching frequency is selected to be 0%. Further, symbol "CV3" indicates a characteristic for showing a relationship between the CNR and the bit error rate in such a case that the switching frequency is selected to be 50%. In the present embodiment, the switching frequency is controlled in the variable manner, so that such a control result indicated by symbol "CV4" is obtained in order that the bit error rate is suppressed lower than or equal to a sensitivity point "SP."

Figure 5:
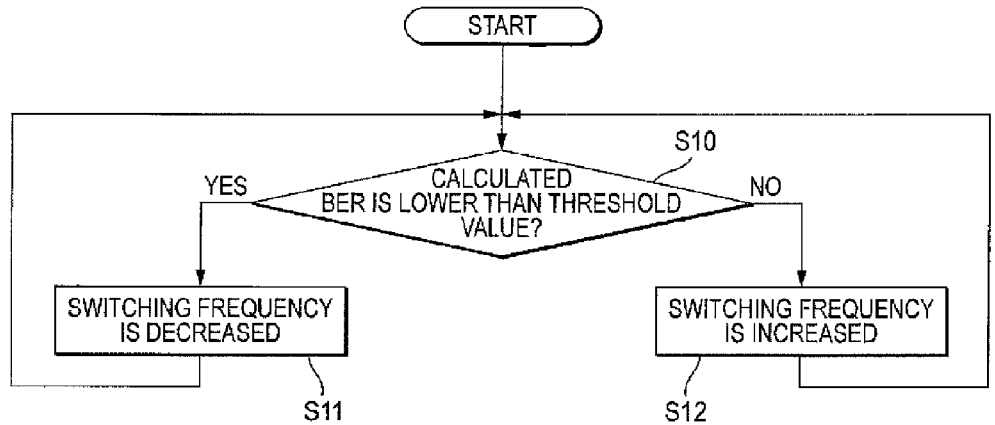
FIG. 5 is a flow chart for describing a control operation for the switching frequency in the diversity receiver according to the above-described embodiment.

FIG. 5 is a flow chart for describing a control operation for controlling the switching frequency in the diversity receiver according to the present embodiment. As indicated in this flow chart, a judgment is made whether or not a bit error rate calculated by the bit error rate calculator 107 is lower than the threshold value "Th" (step S10), and then, when the calculated bit error rate is lower than the threshold value "Th", an execution of the diversity reception is not required, but the single reception may be carried out under sufficient sensitivity condition, so that the switching frequency is decreased (step S11). To the contrary, when the calculated bit error rate is higher than the threshold value "Th", the diversity reception must be carried out, so that the switching frequency is increased (step S12). Subsequently, process operations defined from the step S10 to the step S12 are repeatedly performed in a similar manner.

As previously described, in accordance with the diversity receiver of the present embodiment, the switching frequency for alternately switching the initiating operation and the stopping operation of the diversity reception is variably changed in response to the bit error rate. As a result, the compatibility between the reception performance and the current consumption can be improved. Also, the switching frequency is controlled in such a manner that the bit error rate becomes lower than or equal to the predetermined threshold value. As a result, the diversity operation can be controlled in such a manner that the target characteristic can be satisfied without employing the parameter which depends upon the moving speed, such as the CNR.

Figure 6:
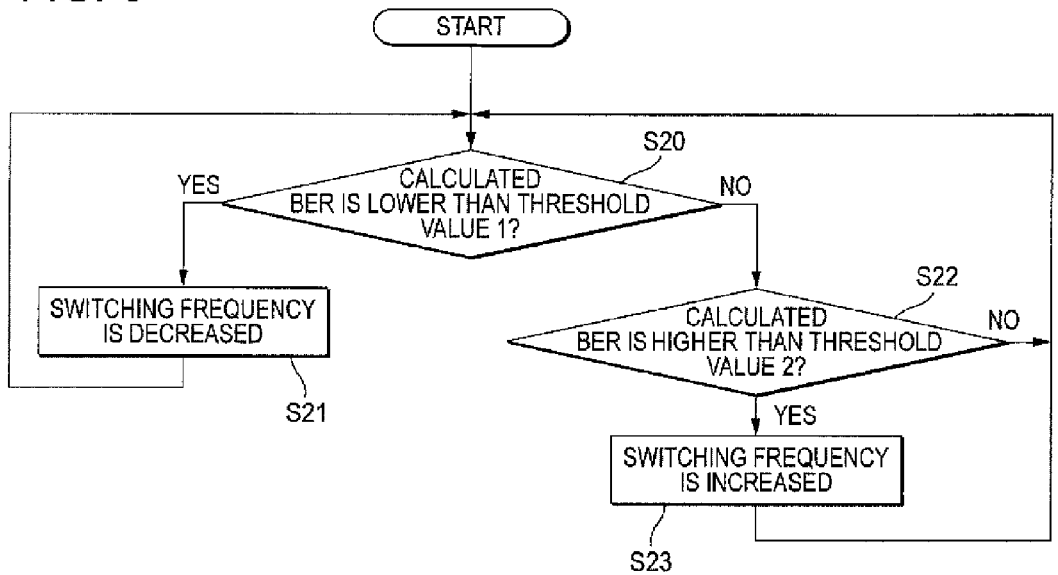
FIG. 6 is a flow chart for explaining an application example of the control operation for the switching frequency in the diversity receiver according to the above-described embodiment.

It should be understood that although only one threshold value "Th" to be compared with the bit error rate has been employed in the above-described embodiment, a plurality of threshold values may be alternatively employed and the respective threshold values may be alternatively compared with the bit error rate. FIG. 6 is a flow chart for representing a control operation for controlling switching frequencies in such a case that two sets of threshold values "Th." In this case, large/small relationship between two threshold values "Th1" and "Th2" is defined as the threshold value "Th1"<the threshold value "Th2." In this flow chart, firstly, a judgment is made whether or not a bit error rate calculated by the bit error rate calculator 107 is lower than the threshold value "Th1" (step S20), and then, when the calculated bit error rate is lower than the threshold value "Th1", the execution of the diversity reception is not required, but the single reception may be carried out under sufficient sensitivity condition, so that the switching frequency is decreased (step S21). To the contrary, when the calculated bit error rate is higher than the threshold value "Th1", another judgment is made whether or not this calculated bit error rate is higher than the threshold value "Th2" (step S22). If the calculated bit error rate is lower than the threshold value "Th2", then the control operation is returned to the previous step S20, whereas if the calculated bit error rate is higher than the threshold value "Th2", the diversity reception must be carried out, so that the switching frequency is increased (step S23). Subsequently, process operations defined from the step S20 to the step S23 are repeatedly performed in a similar manner.

Figure 7:
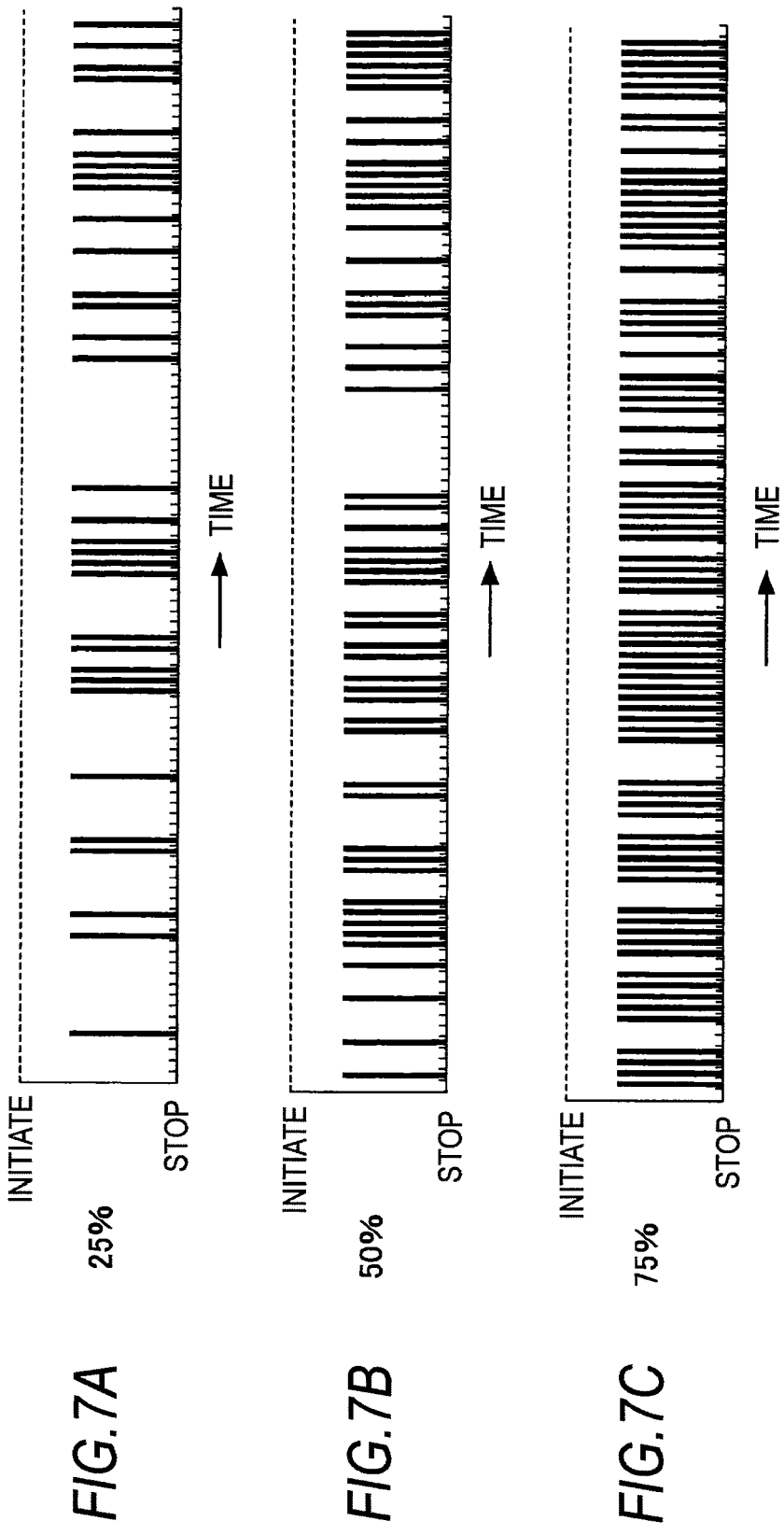
FIG. 7 is a diagram for explaining the application example of the control operation for the switching frequency in the diversity receiver according to the above-described embodiment.
Figure 8:
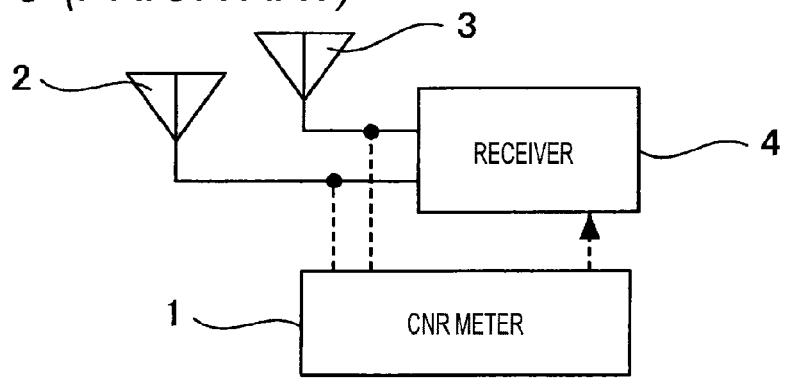
FIG. 8 is a block diagram for schematically representing the arrangement of the conventional diversity receiver.
Figure 9:
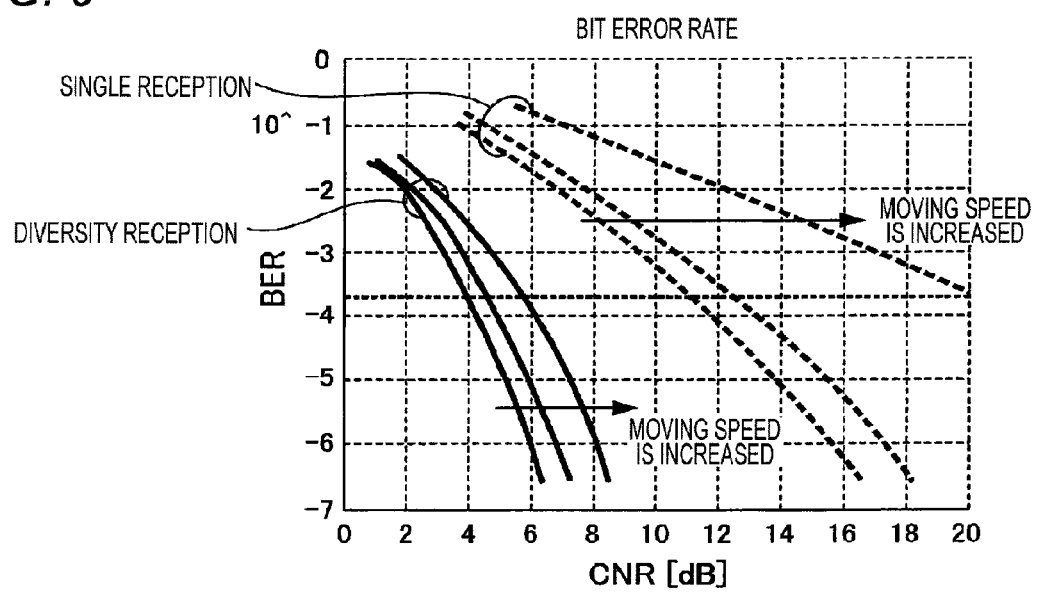
FIG. 9 is a diagram for explaining the problem occurred in the conventional diversity receiver.
Figure 10:
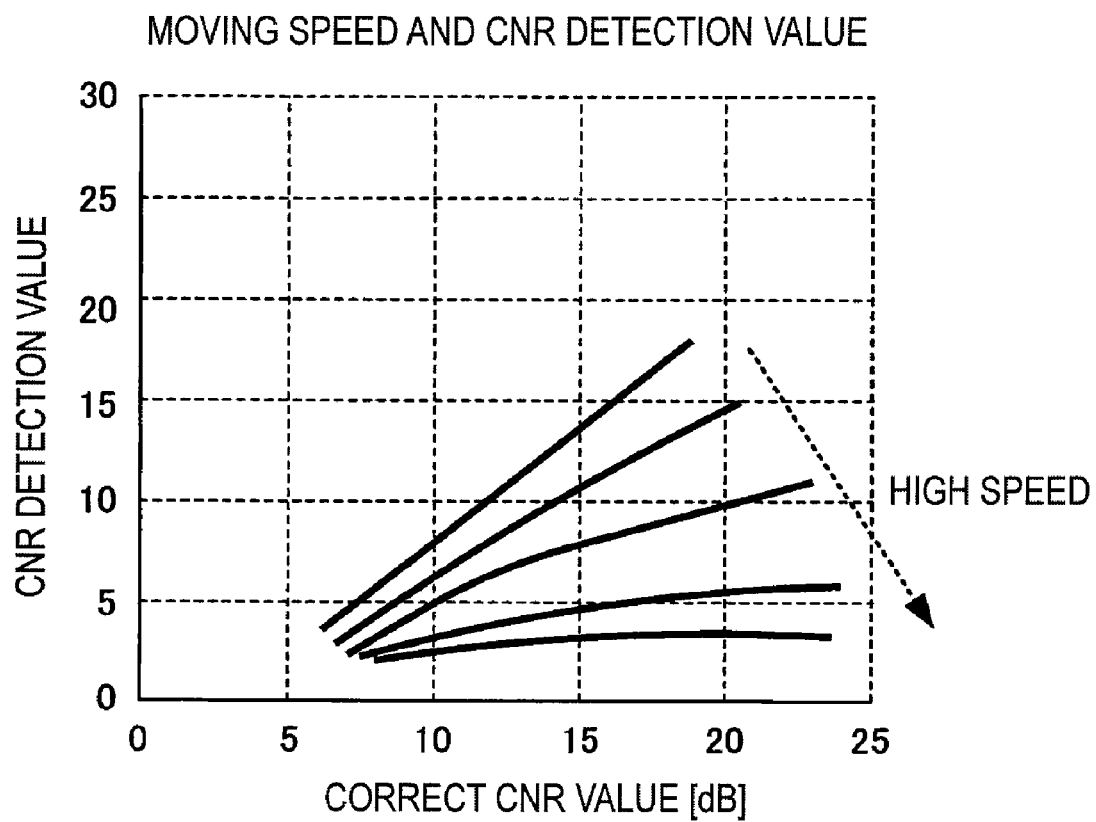
FIG. 10 is a diagram for explaining the problem occurred in the conventional diversity receiver.

Also, in the above-described embodiment, the switching frequency is variably changed based upon the pulse width of the rectangular wave. Alternatively, the switching frequency may be variably changed based upon a random number. In other words, while the switching frequency calculator 108 is provided with a random number generator (not shown), the switching frequency calculator 108 calculates an initiation and a switching frequency for a diversity reception in response to the random number generated by the above-described random number generator; and the switching controller 105 performs a switching control operation in accordance with the initiation and switching frequency for the diversity reception, which is calculated by the switching frequency calculator 108. FIGS. 7A to 7C represent such an example that a switching frequency is variably changed by employment of the random number. FIG. 7A shows the switching frequency of 25%; FIG. 7B indicates the switching frequency of 50%; and FIG. 7C represents the switching frequency of 75%. The larger the number of initiations is increased, the larger the execution of the diversity operation is increased.

Also, the above-described embodiment has described such a case that two series of the antennas 101 and 102, and the receivers 103 and 104 have been mounted. Alternatively, even in such a case that two or more series of the antennas and the receivers are mounted, a similar effect may be achieved.

While the present invention has been described in detail, or with reference to the specific embodiment, it is apparent that ordinarily skilled persons in the art can modify and/or change the inventive idea of the present invention without departing from the technical scope and spirit of the present invention.

Industrial Applicability

The present invention has such an effect that the compatibility between the reception performance and the current consumption can be improved, and furthermore, the diversity operation can be controlled in such a manner that the target characteristic can be satisfied without employing the parameter which depends upon the moving speed, such as the CNR. The present invention can be applied to a diversity receiver using a plurality of receiving branches, more specifically, may be applied to a portable telephone, a car navigation system, and the like, which are capable of receiving terrestrial digital broadcasting programs.

The invention claimed is:

1. A diversity receiver, comprising:
a plurality of antennas which receives radio signals;
a plurality of receivers which receives the radio signals respectively, which are captured by the plurality of antennas;
a switching controller which switches to select all of the plural receivers and to select any one of the plural receivers in accordance with a switching frequency which indicates a ratio establishing how often operation of a diversity reception is initiated and maintained per unit time during a reception operation so as to synthesize respective output signals of the plural receivers with each other to output a synthesized signal in a case where all of the plural receivers are selected during said diversity reception;
a demodulator which demodulates one output signal or all of output signals from the plural receivers selected by the switching controller;
a bit error rate calculator which calculates a bit error rate based upon a demodulation result of the demodulator; and
a switching frequency calculator which varies the switching frequency between 0% and 100% in response to the bit error rate calculated by the bit error rate calculator, wherein the switching frequency calculator includes a random number generator, and calculates an initiation and the switching frequency of the diversity reception in response to a random number generated by the random number generator,
wherein the switching controller controls a switching operation in accordance with the initiation and the switching frequency of the diversity reception calculated by the switching frequency calculator.

2. A diversity receiver, comprising:
a plurality of antennas which receives radio signals;
a plurality of receivers which receives the radio signals respectively, which are captured by the plurality of antennas;
a switching controller which switches to select all of the plural receivers and to select any one of the plural receivers in accordance with a switching frequency for alternately switching an initiating operation and a stopping operation of a diversity reception so as to synthesize respective output signals of the plural receivers with each other to output a synthesized signal in a case where all of the plural receivers are selected;
a demodulator which demodulates one output signal or all of output signals from the plural receivers selected by the switching controller;
a bit error rate calculator which calculates a bit error rate based upon a demodulation result of the demodulator; and
a switching frequency calculator that includes a random number generator, calculates the switching frequency in response to the bit error rate calculated by the bit error rate calculator, and calculates an initiation and the switching frequency of the diversity reception in response to a random number generated by the random number generator,
wherein the switching controller controls a switching operation for performing the diversity reception in accordance with the initiation and the switching frequency of the diversity reception calculated by the switching frequency calculator.

* * * * *